United States Patent [19]

Choay et al.

[11] 4,168,377

[45] Sep. 18, 1979

[54] PROCESS OF PREPARING MIXED HEPARIN SALTS

[75] Inventors: Jean Choay, Paris; Jean Goulay, Oissel; Jean-Louis Amiot, Maromme, all of France

[73] Assignee: Choay, S. A., Paris, France

[21] Appl. No.: 459,712

[22] Filed: Apr. 10, 1974

[30] Foreign Application Priority Data

Apr. 13, 1973 [FR] France ............................... 73.13580
Apr. 13, 1973 [FR] France ............................... 73.13581

[51] Int. Cl.$^2$ ............................................. C08B 37/10
[52] U.S. Cl. ....................................... 536/21; 424/183
[58] Field of Search ......................... 424/183; 536/21; 260/211.7, 211 R

[56] References Cited

U.S. PATENT DOCUMENTS

| 2,623,001 | 12/1952 | Sylven et al. ............................ 536/21 |
| 3,192,114 | 6/1965 | Hogberg et al. ....................... 424/183 |
| 3,506,642 | 4/1970 | Koh et al. ........................ 260/211 R |

FOREIGN PATENT DOCUMENTS 6853M 4/1969 France ................................ 260/211 R

OTHER PUBLICATIONS

Sisler et al., General Chemistry, 1949, pp. 214, 215 and 670, The MacMillian Co., New York, N.Y.
Merck Index, 9th ed., Merck & Co., Rahway, N.J. (1976), p. 4510.
American Heritage Dictionary, Houghton Mifflin Co., Boston (1969)–(1976), p. 364.
Nomine, et al., Bull. Soc. Chim. France (1961), pp. 561–567.
Detrie, et al., Presse Med., vol. 70 (1962), pp. 627 and 628.
Lippman, Chemical Abstracts, vol. 69 (1968), 42430v.
Gadrat, et al., Chemical Abstracts, vol. 72 (1970), 53689z.
Karetnyi, et al., Chemical Abstracts, vol. 62 (1965), 2667d.
Choay et al., "Calcium Salt . . . Impurity", Chem. Abst., vol. 83, p. 334, 152343r, 1975.

*Primary Examiner*—Richard Raymond
*Attorney, Agent, or firm*—Weiser, Stapler and Spivak

[57] ABSTRACT

Mixed or simple heparin salt having a reduced amount of a selected metal ion alone or with another metal ion in a mixed heparin. A heparin salt having a reduced sodium content being essentially sodium free and having a selectively high calcium or other selected salt content. A process for making these heparin salts by reaction with the selected metal salt, including, optionally, dialysis or precipitation. A typical heparin salt is a calcium heparin essentially free of sodium (like containing less than about 1% by weight of sodium), or a mixed calcium-sodium heparin with a limited, predetermined content of sodium. Drug compositions containing these heparin salts and a pharmaceutical carrier. The drugs made from these heparin salts are useful as anti-coagulants.

47 Claims, No Drawings

PROCESS OF PREPARING MIXED HEPARIN SALTS

The invention relates to a method of preparing simple heparin salts containing cations of metals other than sodium or mixed heparin salts, i.e. salts containing cations of a number of metals, possibly including sodium, and wherein the proportions of the different metals correspond to preselected values as required.

The invention also relates to novel heparin salts for use as active principles of drugs, inter alia anti-coagulants which have all the well-known therapeutic properties of heparin and are also substantially free from side-effects such as petechias and haematomas which have hitherto limited the use of heparin in certain therapeutic applications.

Commercial or purified heparins are frequently available in the form of sodium salts, usually as a result of the conditions under which the heparins are prepared, inter alia by extraction from natural biological media containing them, and purification.

It is known, however, that there are some disadvantages in the therapeutic use of the aforementioned salts, the anti-coagulant activity of which is well known. Since heparin has a more marked affinity for calcium than for sodium, the administration of sodium heparinate is accompanied by fixation of the calcium retained in the different tissues of the organism, more particularly at the vascular and capillary walls.

When a highly-concentrated solution is subcutaneously administered, the chelation effect of calcium is increased at the expense of the neighbouring capillary beds, the permeability of which is reduced. This results in petechias and haematomas.

To obviate these difficulties, it has already been proposed to substitute partially the sodium cations in the heparin salts, inter alia by calcium. The resulting salts, which then contain an appreciable proportion of calcium ions, have been found to be much more easy to use in therapy. They still, however, contain appreciable proportions of sodium corresponding to orders of magnitude of 5 to 4% by weight approximately. It has been found, however, that these mixed salts, though enriched in calcium, are still capable of inducing some of the aforementioned side-effects, inter alia in the treatment of states of acute hypercoagulability requiring local injections, e.g. subcutaneous injections, of highly concentrated doses of heparin in order to obtain a rapid, satisfactory anti-coagulating effect.

The processes hitherto used for replacing sodium by calcium usually involve either direct recontacting of the heparin sodium salts with a calcium salt, e.g. calcium chloride, or isolating the heparin in its free acid form, inter alia on an acid or slightly acid ion-exchange resin.

The direct-contact method, however, can replace only a limited proportion of sodium ions in the initial salt by calcium ions. Admittedly it is found that, for a given concentration of heparin, the addition of increasing quantities of calcium chloride results, in a first stage, in a quantitative fixation of the added calcium ions to the heparin. For example, by adding 6.5 g of calcium in the form of calcium chloride to 100 g of sodium heparinate, inter alia under conditions which will be described in the examples, it is very easy to obtain a mixed heparinate containing 6% by weight of calcium. An analysis of this heparinate, however, shows that it still contains 5.12% by weight of sodium.

During a second stage, however, inter alia when the proportion of calcium becomes greater than 6%, the fixation of calcium is no longer quantitative if more calcium chloride is added. For example, in order to obtain a calcium content of 8.75%, it is necessary to add 12% of calcium to the medium. If the addition is continued until an even higher calcium concentration is obtained, it is impossible to eliminate all the sodium.

The aforementioned method, therefore, cannot provide a calcium heparinate having the desired complete freedom from sodium ions. In general, at least under prior-art conditions, it cannot provide mixed heparin salts, e.g. calcium and magnesium salts, which are substantially free from sodium ions, starting from a raw material comprising a sodium heparinate.

The other kind of method considered in a very general manner hereinbefore can in principle obviate the aforementioned disadvantages. However, the intermediate heparinic acid state has a number of other disadvantages, one particularly dangerous disadvantage being the fact that heparinic acid is unstable, irrespective of the operative conditions. The recorded loss of anti-coagulant activity is between 20 and 30% with respect to the activity of the heparin used.

Furthermore, it can easily be seen that this kind of method is very difficult or impossible to apply to the manufacture of mixed salts having predetermined relative concentrations of different metal ions.

The object of the invention is to obviate these various disadvantages.

More particularly, one object of the invention is to provide sodium-free heparin salts which can be used under all circumstances without the risk of producing the aforementioned side-effects. Another object is to provide a method which, starting from a given simple heparin salt, inter alia a sodium heparin salt, can easily provide simple heparin salts of a metal other than sodium, practically free from any other metal ion, or mixed salts containing predetermined relative contents, as required, of distinct metal ions, irrespective of the nature of the metals.

The heparin salts according to the invention are characterised in that they contain less than 0.1% of sodium.

More particularly, the invention relates to calcium heparin salts characterised in that they contain at least 10% by weight of calcium. A preferred heparin salt according to the invention contains 10.3 to 10.6% by weight of calcium and less than 0.1% by weight of sodium.

The method according to the invention comprises a first phase wherein a simple initial heparin salt is first contacted with a salt of the metal to be substituted for the metal in the initial heparinate, and is characterised in that, in a second phase, the medium containing the resulting heparinate is subjected at least once to a cycle of operations which comprises separating the free metal ions from said medium and recontacting the resulting heparinate with the salt containing the substituting metal.

Preferably the initial simple heparin salt is sodium heparinate.

The invention is based on the discovery that, during the reaction between a sodium heparinate and calcium chloride, the sodium ions liberated in the form of sodium chloride during the initial reaction compete with the calcium ions and finally tend to stop the exchange, even though heparin has a stronger affinity for calcium than for sodium. If, therefore, the sodium ions are previously eliminated, the remaining sodium ions in the heparinate can be replaced by calcium ions.

Of course, similar phenomena are involved in the reaction of an initial salt comprising a sodium or other metal heparinate with a salt of a metal other than calcium.

It is found that if, in the second aforementioned phase, the free metal ions are separated in a single operation followed by a single re-contacting of the heparin-containing solution with a sufficient quantity of a salt of the substituting metal, the resulting heparinate contains a higher proportion of ions of the substituting metal than if the heparinate had been obtained at the end of the first phase only, even if a larger quantity were used of the salt of the substituting metal relative to the quantity of the initial single salt.

In other words, the method according to the invention, when applied to the manufacture of a simple sodium-free heparin salt, e.g. the calcium salt, comprises a first phase wherein the sodium salt of heparin is contacted with a salt (e.g. calcium chloride) of the metal, inter alia calcium, which is to take the place of sodium, and a second phase comprising at least one cycle of operations comprising the separation of the free metal ions from the heparinate obtained with the calcium salt until the initial heparin salt is substantially or even totally free of sodium. The replacement of the sodium ions can be continued owing to the intermediate elimination of sodium ions during the separation phase.

It is found however, that when the contacting during the first phase results in the replacement of a relatively large proportion of the metal ions in the initial heparinate by ions of the substituting metal, a single cycle of operations according to the second phase of the method according to the invention may be sufficient to replace substantially all the metal ions in the initial heparinate.

For example, starting from a heparin salt solution containing 8.75% calcium, the salt can be practically freed from sodium, after the free metal ions have been separated from the medium, by re-contacting the heparin salt with a quantity of calcium chloride corresponding to an addition of 10% by weight of calcium with respect to the heparinate. At the end of the operation, the heparinate contains about 10.5% by weight of calcium.

A heparinate containing 10.2% of calcium can be obtained by re-contacting a solution of the same heparinate containing 8.75% calcium with a quantity of calcium chloride corresponding to an addition of only 3% by weight of calcium.

The operation of separating the freed ions in the aforementioned second phase can be performed in any known manner, but is preferably performed by dialysis, inter alia against demineralised water, or by precipitating the heparinate obtained in a medium, inter alia a hydro-alcoholic medium preferably having a strength not exceeding 70° GL, in which the salts formed by the liberated metal ions are soluble.

If dialysis is used, inter alia against demineralised water, it should usually be continued for sufficient time to eliminate practically all the sodium ions liberated after the first contacting. If required, the dialysis operation may be performed at the same time as the first contacting process, if care is taken to start with an excess of the calcium salt so that the sodium ions liberated by the calcium salt are separated from the reaction medium as fast as they are liberated, so that the first contacting operation, e.g. when given quantities of the sodium salt of heparin and of calcium chloride are used, eliminates sodium more completely from the initial heparin than would be possible by using the same quantities of reagents but without simultaneous dialysis.

If required, dialysis needs not be started until some, e.g. 6%, of the sodium has already been replaced by calcium, i.e. until there is appreciable competition between the sodium and calcium ions, preventing the substitution from continuing. In order, for example, to obtain a heparin salt containing 8.75% calcium, the initial heparinate can be contacted with a quantity of calcium chloride corresponding to an addition of 12% calcium, dialysis being started when the quantity of calcium fixed on the heparin has reached about 6%, i.e. about 16 hours after the sodium salt of heparin has been contacted with calcium chloride, after which dialysis is continued for 6 hours.

If the precipitation method is used, the resulting heparinate precipitate is re-dissolved in distilled water and again placed in the presence of calcium ions, inter alia in the form of calcium chloride. For example, starting from a mixed sodium and calcium heparinate solution containing 8.75% calcium and obtained under the aforementioned conditions, it is easy to obtain a calcium salt of heparin which is practically free from sodium ions, merely by precipitating the mixed heparin in neutral ethyl alcohol, re-dissolving the precipitate in water and adding to the resulting aqueous solution a quantity of calcium chloride corresponding to an addition of 3% calcium with respect to the weight of heparin initially used.

Of course, the two methods of separation can be associated, inter alia by first dialysing the medium and then precipitating the heparinate so as to separate it from the reaction medium, after which the precipitated heparinate is re-dissolved and again contacted with the salt containing the desired substituting metal.

In all cases, therefore, it is easy to obtain calcium heparinate containing between 10.3 and 10.6% calcium ions and less than 0.1% sodium. It has been found that, luckily, the anti-coagulating activity of the initial heparin is completely preserved in the final product.

The resulting completely sodium-free calcium heparinate may advantageously be used in therapy, in that it can be administered in very concentrated doses by local, inter alia subcutaneous, injections. Maximum advantage can therefore be obtained from the high anti-coagulating activity of heparin while avoiding the aforementioned side-effects on the patients.

Furthermore, subcutaneous administration of a highly concentrated solution is particularly advantageous since it can delay the anti-coagulating effect of heparin and thus avoid perfusions or repeated intravenous injections.

The method according to the invention, therefore, yields completely sodium-free calcium heparin under conditions which are easy to work in, without using the acid form of heparin as an intermediate, and consequently without any risk of losing the anti-coagulating activity.

Completely sodium-free heparinates of magnesium or other cations can be prepared under the same conditions.

So far, we have mainly been concerned with the application of the method according to the invention to the preparation of simple heparin salts containing cations different from the cations, inter alia sodium, in the initial salt.

The method, however, is equally suitable for preparing mixed heparin salts containing ions of the aforementioned substituting metal and ions of a different metal in predetermined proportions if, according to the invention, the method is supplemented by a third phase characterised in that the simple heparinate of the substituting metal obtained at the end of the second phase is contacted with a quantity of a salt of the different metal depending on the desired relative proportions of the ions of the substituting metal and of the separate metal in the final mixed heparinate.

Of course, the proportion of ions of the substituting metal which can thus be replaced during the third phase may itself be limited under conditions similar to those which have already been considered in connection with the contacting of a sodium salt of heparin with a calcium salt such as calcium chloride. In that case, however, we shall clearly have to return to the two-phase method described hereinbefore, if it is desired to exceed the limiting rates of substitution which could be obtained by mere contacting.

We thus obtain a very easy method of preparing mixed heparinates containing predetermined relative proportions of any different metal ions, starting from a raw material comprising inter alia a sodium heparinate, and proceeding via the completely sodium-free single salt of one of the metals to be incorporated in the mixed salt. For example, a mixed calcium and magnesium heparinate can be prepared from a sodium salt of heparin as follows: First the sodium free single salt of one of the metals is formed in the first two phases of the method according to the invention, and secondly, the desired proportion of metal ions in the resulting simple heparin salt are substituted by contacting the metal salt, during the third phase, with the corresponding predetermined quantity (as indicated hereinafter in the examples) of a salt, e.g. chloride, of the other metal.

The reactions during the first and second phase of the aforementioned method need not be continued until a completely sodium-free calcium salt is obtained, if it is desired to prepare mixed salts wherein one of the metal ions is the same as in the initial heparinate used during the first phase of the method according to the invention, e.g. sodium, but wherein the content of the other metal ion is greater than would be obtained simply by contacting the corresponding reagents, e.g. in the case of a mixed heparinate having a high calcium content and a low sodium content. For example, smaller quantites of calcium salts may be used in the first and second phases, depending on the final constitution of the desired mixed salt.

Of course, the same object can be achieved by first preparing the sodium-free calcium salt and then contacting it with a sufficient quantity of sodium chloride to produce a limited exchange between calcium and sodium ions.

The method according to the invention can also be used for preparing substantially sodium-free mixed heparinates, e.g. calcium and magnesium heparinates, starting from a raw material comprising sodium heparinate.

For example, in the method according to the invention, mixed heparinates can be prepared having predetermined relative proportions in accordance with particular needs, depending on the required applications, inter alia in therapy, and the conditions under which the heparinates are to be administered.

The description of the invention will be supplemented by a description of a general method of preparing a sodium-free calcium salt of heparin (of course sodium-free salts of other metals could be prepared under similar conditions) and of a number of examples, for the purpose only of illustrating the great versatility of the method according to the invention and the variety of products obtained thereby.

GENERAL METHOD OF OPERATION

First we shall describe a general method of preparing substantially sodium-free calcium heparinate, starting from heparin in the form of its sodium salt.

Sodium heparinate is dissolved in distilled water to obtain a concentration of 15,000 to 20,000 IU/ml, i.e. 10 to 12.5%; the temperature is kept between 10° and 40° C., preferably 25° C. A quantity of calcium in the form of calcium chloride is introduced with agitation into the heparin solution, the quantity being between 10 and 40%, preferably 12% by weight of the heparin used. The pH of the medium is brought to 7.5, using CaO; agitation is continued for 8 to 24 hours, preferably 16 hours, at a constant temperature of 25° C., after which dialysis is performed for 6 hours. The dialysate is collected and filtered on an asbestos plate.

The filtered dialysate is brought to a pH between 4 and 7.5, preferably 6.5, by adding hydrochloric acid. Next, 96° GL neutral ethyl alcohol is added in the proportion of 1.5 parts of alcohol to 1 part of dialysate; the mixture is left for 2 to 6 hours and the resulting heparinate is collected in 99.5° GL neutral alcohol, followed by simultaneous crushing and agitation. The mixed calcium-sodium heparinate obtained after filtration is dissolved in sufficient distilled water to obtain a solution containing 15,000 to 20,000 UI/ml. Next, a quantity of calcium in the form of calcium chloride is added with agitation and at a temperature of 25° C., the quantity being between 3 and 15%, preferably 10%. Agitation is continued for 8 to 24 hours, preferably 12 hours, keeping the pH constant at approx. 7.3 by adding Ca (OH)$_2$ or 2 N HCl.

After 12 hours agitation, the Ca$^{++}$ heparinate solution is distributed in dialysing tubing and dialysed for about 6 hours at ambient temperature in apyrogenic demineralised water. The resulting dialysate has a conductivity of 10,000 μMho at 25° C. and a pH of 7.2. The pH is adjusted to 5.5 with 2 N hydrochloric acid, 0.3%, of metacresol bacteriostatic agent is added, and the dialysate is filtered on asbestos. After standing for 2 hours, the calcium heparinate is precipitated from the solution by adding 1.5 parts of 96° GL neutral ethyl alcohol.

The calcium heparinate is collected in 10 volumes of 99.5° GL neutral ethyl alcohol, crushed, filtered, and washed over a Buchner funnel with 99.5° GL neutral ethyl alcohol. The resulting sodium-free calcium heparinate is dried in vacuo at 0.1 Torr at a temperature of 45° C.

It is thus easy to obtain a calcium heparinate having an anti-coagulating activity of the order of 160 IU/mg, a calcium content of the order of 10.6% and a sodium content of the order of 0.05%, inter alia from a Codex heparin in the form of its sodium salt having the composition given hereinafter.

In the following examples, the initial heparin was in accordance with the following standards:

| | |
|---|---|
| Appearance: | according to standard |
| 5% solution: | clear |
| heavy metals: | none |
| proteins: | none |
| total nitrogen: | 2.2% |
| sulphur: | 10.7% |
| anti-coagulating activity: | 166 IU/mg |
| pyrogenic substances: | apyrogenic (to the standards according to the general methods of analysis given in French Pharmacopoeia, 8th Edition, page 1615) |
| Histaminic substances: | none |
| ammonium content: | <0.1% |
| calcium content: | <0.1% |
| sodium content: | 11.5% |
| potassium content: | 0.5% |
| magnesium content: | <0.1% |

EXAMPLE I

Calcium heparinate 100 g of Codex heparin in accordance with the aforementioned standards and titrating 160 IU/mg, i.e. a total of 16 million IU, were dissolved in 800 ml distilled water; the conductivity was 22,000 μMho at 25° C. and the pH was 7. The equivalent of 12 g calcium in the form of $CaCl_2$, $2H_2O$, mol. wt. 147, i.e. 44 g $CaCl_2$, 2 $H_2O$ was added with agitation, the conductivity was 50,000 μMho and the pH was 5. 200 mg CaO was added to adjust the pH to 7.5, after which the mixture was agitated for 16 hours, the temperature being kept at 25° C., whereafter the solution was distributed among precision dialysing tubing of the kind known as Nojax, i.e. 300 ml of solution per tube; the tubing was placed in the presence of 6 liters of demineralised water having a resistivity of 1000K Ω/cm and left in contact for 6 hours. 1600 ml of dialysate was obtained having a conductivity of 20,000 μMho and a pH of 7.

The dialysate was filtered through a Buchner funnel which had previously been decontaminated by treatment with Javel water, and was then washed with apyrogenic demineralised water and again decontaminated in 0.3% phenolated water and washed to neutrality with apyrogenic demineralised water. Filtration was performed on a EKS 2 type asbestos disc, which had previously been washed in a solution of 5 N HCl and washed to neutrality with apyrogenic demineralised water.

Filtration took 1 hour and 250 ml of demineralised water was used for 1 washing operation on the asbestos disc.

The filtrate and washing liquors were combined, giving 1900 ml; and brought to pH 6.5 with a few drops of 2 N hydrochloric acid, after which 2850 ml of 96° GL neutral ethyl alcohol was added with agitation; the mixture was left to stand for 2 hours, after which the resulting mixed calcium-sodium heparinate was collected in 1000 ml of 99.5° GL ethyl alcohol, followed by slight crushing in alcohol, using an ultra-Turax grinder, filtering through a Buchner funnel at slight negative pressure and maximum drying without heating. The mixed calcium-sodium heparinate was dissolved in 800 ml distilled water with agitation. The equivalent of 10 g calcium was added in the form of calcium chloride, i.e. 36.7 g $CaCl_2$, 2 $H_2O$; the pH was adjusted to 7.3 with CaO (approx. 100 mg) after which the mixture was left with agitation at 25° C. for 16 hours. After this time, the solution was again dialysed under the same conditions as before for 6 hours. The dialysate (1500 ml) had a conductivity of 10,000 μMho and a pH of 7.2; the pH was brought to 5.5 with 2 N hydrochloric acid, whereupon 4.5 g metacresol were added. The solution was filtered on an EKS 2 asbestos disc prepared under the conditions previously mentioned. The filtrate and washing liquors (1700 ml) were mixed with 2550 ml of 96° GL neutral ethyl alcohol with manual agitation. After standing for 2 hours, the calcium heparinate was collected in 1000 ml of 99.5° GL neutral ethyl alcohol and crushed in alcohol, using an ultra-Turax agitator. The calcium heparinate was filtered on a Buchner funnel, dried, washed with 200 ml of 99.5° GL ethyl alcohol, and then dried at 0.1 Torr at 45° C. 102 g of calcium heparinate was obtained, titrating 155 IU/mg, i.e. 15,800,000 IU. Yield: 99%.

The calcium content of the anhydrous product was 10.4%.

The sodium content of the anhydrous product was 0.05%.

EXAMPLE II

Calcium heparinate 10,000 g of Codex heparin titrating 160 IU/mg, i.e. a total of 1,600,000,000 UI, were dissolved in 80 l of distilled water. The conductivity was 22,000 μMho at 25° C. and the pH was 7. The equivalent of 1200 g calcium in the form of calcium chloride, 2 $H_2O$, i.e. 4400 g, was introduced with agitation; the conductivity of the medium was 50,000 μMho and the pH was 5. The pH was brought to 7.5 by adding 20 g calcium oxide. The mixture was agitated for 16 hours at a constant temperature of 25° C., after which the solution was distributed among Nojax precision dialysing tubing, i.e. 300 ml per tube; the tubing was placed in a bath containing 600 l of apyrogenic demineralised water having a resistivity of 1000 K Ω/cm and left in contact for 6 hours. The dialysate, the conductivity of which was 20,000 μMho, had a volume of 160 l and the pH was 7.

The dialysate was filtered through a corrosion-resistant Buchner funnel which had previously been decontaminated with treatment with Javel water, and was then washed with apyrogenic demineralised water, again decontaminated with 0.3% phenolated water and finally washed to neutrality with apyrogenic demineralised water. Filtration was carried out on an EKS 2 asbestos disc which had previously been washed with a solution of 5 N HCl and washed to neutrality with apyrogenic demineralised water.

Filtration took 12 hours, and 24 l of apyrogenic demineralised water was used for one washing operation on the asbestos disc.

The filtrate and washing liquors were combined, giving 185 l which were brought to pH 6.5 with 2 N hydrochloric acid. 277.5 l of 96° GL neutral ethyl alcohol were added with agitation and the mixture was left to stand for 2 hours, after which the resulting mixed calcium-sodium heparinate was manually collected in 100 l of 99.5° GL ethyl alcohol. The mixed calcium-sodium heparinate was dissolved in 80 l distilled water and the equivalent of 1000 g calcium, i.e. 3670 g of $CaCl_2$, $H_2O$ was added with agitation. The pH was adjusted to 7.3 with calcium oxide (approx. 1000 mg) and the mixture was agitated at 25° C. for 16 hours, after which the solution was again dialysed under the same conditions as before for 6 hours. The dialysate (150 l) had a conductivity of 10,000 μMho and a pH of 7.2. The pH was brought to 5.5 with 2 N hydrochloric acid, after which 450 g of metacresol was added. The solution was filtered on an EKS 2 asbestos disc prepared under the conditions described previously. The combined filtrate and washing liquors (170 l of solution) were mixed with 255 l of 96° GL neutral ethyl alcohol, with manual agitation. After standing for 2 hours, the calcium heparinate was collected in 100 l 99.5° GL neutral ethyl alcohol and crushed in alcohol, using an ultra-Turax agitator. The calcium heparinate was filtered through a Buchner funnel, dried, washed with 200 ml of 99.5° GL ethyl alcohol, and dried at a pressure of 0.1 Torr at 45° C. 10,300 g calcium heparinate was obtained, titrating 155 IU/mg, i.e. a total of 1,600,000,000 IU. Yield: 100%.

Calcium content: 10.4%
Sodium content: 0.04%

EXAMPLE III

Preparation of magnesium heparinate 100 g of Codex heparin in accordance with the aforementioned standards and titrating 160 IU/mg, i.e. 16,000,000 IU, were dissolved in 800 ml distilled water, the conductivity being 22,000 μMho at 25° C. and the pH being 7. The equivalent of 12 g magnesium, i.e. 100 g $MgCl_2$, 6 $H_2O$, was added with agitation. The conductivity was 50,000 μMho and the pH was 5. 200 mg of MgO were added to adjust the pH to 7.5, and the mixture was agitated for 16 hours at a constant temperature of 25° C., after which the solution was distributed among precision Nojax dialysis tubing, i.e. 300 ml per tube, and the tubes were placed in 6 l of demineralised water having a resistivity of 1000 K Ohms/cm and left in contact for 6 hours. The dialysate was measured, yielding 1600 ml having a conductivity of 20,000 μMho and a pH of 7.

The dialysate was filtered through a Buchner funnel which had previously been decontaminated by treatment with Javel water, washed in apyrogenic demineralised water and again decontaminated in 0.3% phenolate water and washed to neutrality with apyrogenic demineralised water. Filtration was performed on an EKS 2 asbestos disc which had previously been washed with a 5 N HCl solution and washed to neutrality with apyrogenic demineralised water.

Filtration took 1 hour; 250 ml of demineralised water was used for 1 washing operation on the asbestos disc.

The filtrates and washing liquor were combined, giving 1900 ml which was brought to pH 6.5 using a few drops of 2 N hydrochloric acid, after which 2850 ml of 96° GL neutral ethyl alcohol was added with agitation. The mixture was left to stand for 2 hours, after which the resulting mixed magnesium-sodium heparinate was collected in 100 ml of 99.5° GL ethyl alcohol. The mixture was slightly crushed in alcohol, using an ultra-Turax grinder, filtered through a Buchner funnel at slight negative pressure and dried as far as possible.

The mixed magnesium-sodium heparinate was dissolved in 800 ml distilled water and the equivalent of 20 g magnesium, i.e. 167.5 g magnesium chloride 6 $H_2O$, was added with agitation; the pH was adjusted to 7.3 with MgO (about 200 mg), followed by agitation for 16 hours at 25° C., after which the solution was again dialysed under the same conditions as before for 6 hours. The dialysate (1500 ml) had a conductivity of 10,000 μMho and a pH of 7.2. The pH was brought to 5.5 with 2 N hydrochloric acid, after which 4.5 g metacresol was added. The solution was filtered on an EKS 2 asbestos disc prepared under the conditions described previously.

The filtrate and washing liquor (1700 ml) were mixed with 2550 ml of 96° GL neutral ethyl alcohol with manual agitation. After standing for 2 hours, the magnesium heparinate was collected in 1000 ml of 99.5° GL neutral ethyl alcohol and crushed in alcohol, using an ultra-Turax agitator. The magnesium heparinate was filtered through a Buchner funnel, dried, washed with 200 ml of 99.5° GL ethyl alcohol, and then dreid at a pressure of 0.1 Torr and at 45° C.

100 g of magnesium heparinate was obtained having an anti-coagulating activity of 158 IU, i.e. a 98.8% yield, the anhydrous product having a magnesium content of 5.4% and a sodium content of 0.1%.

EXAMPLE IV

Preparation of a mixed calcium-magnesium heparinate from a magnesium heparinate 100 g of magnesium heparinate titrating 158 IU/mg, i.e. a total of 15,800,000 IU, and having a magnesium content of 5.4%, was dissolved in 650 ml distilled water at 25° C. 22 g of calcium chloride dihydrate having a molecular weight of 147, i.e. the equivalent of 6 g calcium, was added with agitation. The pH was adjusted to 7.3 with a trace of calcium oxide and agitated for 16 hours at 25° C. The solution was dialysed against demineralised water for 6 hours. The pH was adjusted to 5.5 using 2 N hydrochloric acid, after which the mixed calcium-magnesium heparinate was precipitated by adding 1.5 volumes of 96° GL ethyl alcohol. The mixture was left to stand for 2 hours, after which the heparinate was collected in 99.5° GL ethyl alcohol, crushed in alcohol, filtered and dried at a pressure of 0.1 Torr and 45° C.

102 g of mixed calcium-magnesium heparinate was obtained, having an anti-coagulating activity of 155 IU/mg—a 100% yield.

$Ca^{++}$ content: 5.85%
$Mg^{++}$ content: 2.41%
$Na^+$ content: 0.02%

EXAMPLE V

Preparation of mixed calcium-magnesium heparinates from magnesium heparinates

The same method as in Example IV was used, starting from magnesium heparinate containing 5.4% as in Example III, to obtain mixed calcium-magnesium heparinates containing the proportions of $Ca^{++}$, $Mg^{++}$, $Na^+$ shown in the three columns on the right of the Table, by contacting simple magnesium heparinate with the quantities of calcium (added in the form of $CaCl_2$, 2 $H_2O$) given in the left column of the Table.

| Percentage Addition of Ca | Percentages in the mixed heparinate of | | |
|---|---|---|---|
| | $Ca^{++}$ % | $Mg^{++}$ % | $Na^+$ % |
| 2 | 1,82 | 4,56 | 0,05 |
| 4 | 4,00 | 3,2 | 0,05 |
| 6 | 5,85 | 2,41 | 0,02 |
| 8 | 7,05 | 1,83 | 0,02 |
| 10 | 8,18 | 1,22 | 0,02 |

EXAMPLE VI

Preparation of a mixed calcium-magnesium heparinate from a 10.5% calcium heparinate 100 g of calcium heparinate titrating 158 IU/mg, i.e. a total of 15,800,000 IU, and containing 10.5% calcium was dissolved in 650 ml distilled water at 25° C. 50 g of magnesium chloride, 6 $H_2O$ (molecular weight 203.3) i.e. the equivalent of 6 g magnesium, was added with agitation. The pH was adjusted to 7.3 with a trace of magnesium oxide and the mixture was agitated for 16 hours. The solution was dialysed against demineralised water for 6 hours. The pH was adjusted to 5.5 with 2 N hydrochloric acid, after which the mixed calcium-magnesium heparinate was precipitated by adding 1.5 volumes of 96° GL neutral ethyl alcohol. After standing for 2 hours, the mixed heparinate was collected in 99.5° GL neutral ethyl alcohol, crushed in alcohol, filtered, and dried at a pressure of 0.1 Torr at 45° C. 103 g of mixed calcium-magnesium heparinate was obtained having an anti-coagulating activity of 152 IU/mg, corresponding to a 99.3% yield.

$Ca^{++}$ content: 7.6%
$Mg^{++}$ content: 1.6%
$Na^+$ content: lower than 0.01%

EXAMPLE VII

Preparation of mixed calcium-magnesium heparinates from 10.5% calcium heparinate The method described in Example VI was used, starting from 10.5% calcium heparinate, to obtain mixed calcium-magnesium heparinates containing $Ca^{++}$, $Mg^{++}$, $Na^+$ in the proportions shown in the three columns on the right of the following Table, by contacting sodium-free calcium heparinate with increasing quantities of magnesium (in the form of $MgCl_2$, 6 $H_2O$) as shown in the left column.

| Percentage of magnesium added | Percentages in mixed heparinate of | | |
|---|---|---|---|
| | $Ca^{++}$ | $Mg^{++}$ | $Na^+$ |
| 1 | 9,15 | 0,81 | 0,02 |
| 2 | 9, | 0,84 | <0,01 |
| 3 | 8,55 | 1 | <0,01 |
| 4 | 8,45 | 1,24 | <0,01 |
| 5 | 7,7 | 1,54 | <0,01 |
| 6 | 7,6 | 1,60 | <0,01 |
| 12 | 6,27 | 2,34 | 0,01 |

EXAMPLE VIII

Preparation of a mixed calcium-sodium heparinate from 10.5% calcium heparinate 100 g calcium heparinate titrating 158 IU/mg, i.e. a total of 15,800,000 IU, containing 10.5% calcium, was dissolved in 650 ml distilled water at 25° C. 6 g of pure crystallised sodium chloride was added with agitation, the pH was adjusted to 7.3 with 1 ml of 2 N NaOH, and the mixture was agitated at 25° C. for 16 hours. The solution was dialysed against demineralised water for 6 hours, left to stand for 6 hours, and the pH was adjusted to 5.5 with 2 N hydrochloric acid, after which the mixed calcium-sodium heparinate was precipitated by adding 1.5 volumes of 96° GL neutral ethyl alcohol and left to stand for 2 hours. The mixed heparinate was collected in 99.5° GL neutral ethyl alcohol, crushed in alcohol, filtered, dried at a pressure of 0.1 Torr at 45° C., and gave 102 g of mixed calcium-sodium heparinate having a coagulating activity of 155 IU/mg, corresponding to a 100% yield.

$Ca^{++}$ content: 8%
$Na^+$ content: 2.4%

EXAMPLE IX

Preparation of mixed calcium-sodium heparinates from 10.5% calcium heparinate

The method described in Example VII, was used, starting from 10.5% calcium heparinate, to obtain mixed calcium-sodium heparinates containing up to 2.4% of $Ca^{++}$ and $Na^+$ by simple contact between the reagents. In order to obtain mixed heparinates having a higher content of sodium, it is preferable to continue the contacting operation under dialysis, more particularly when it is desired to obtain sodium contents above 3%.

| % addition of Na | Percentage in the mixed heparinate of | |
|---|---|---|
| | $Ca^{++}$ | $Na^+$ |
| 2 | 9,55 | 1 |
| 4 | 8,55 | 1,6 |
| 6 | 8 | 2,4 |
| 8 | 7,68 | 2,2 |
| 10 | 7,15 | 3,2 |
| 12 | 6,68 | 4 |

The two columns on the right in the above Table show the proportions of calcium and sodium in the mixed heparinates obtained under the aforementioned conditions by contacting sodium-free calcium heparinate with increasing quantities of sodium as shown in the column on the left of the Table.

Accordingly, the method according to the invention has all the advantages previously mentioned. As we said before, the method can, starting from heparin sodium salts, provide simple salts of metals other than sodium, or mixed heparin salts which are substantially or even completely free from sodium.

The substantially complete elimination of sodium is accompanied by a marked increase in the anti-coagulating activity of heparin. It is found that the anti-coagulating activity increases abruptly by about 10% when the calcium content of a calcium-sodium heparinate increases from 9.5% to 10%. (The determination was made on corresponding heparin salts manufactured from the same initial batch of heparin; the proportioning method used was as described in "French Pharmacopoeia", 8th Edition, 1965, p. 560).

Completely sodium-free heparin salts, more particularly calcium salts, have a remarkable anti-coagulating effect, as shown by the following test reports. They are therefore very valuable as active principles in drugs.

(1) Subcutaneous injection of the rabbit 3 rabbits were subcutaneously injected with 1000 IU/kg of sodium-free calcium heparinate. Blood samples were taken from the central ear artery of each animal, 5 minutes, 15 minutes and 30 minutes after the injection, and then at each hour for 12 hours.

The heparin was determined and the total coagulability was measured, showing an observable heparinaemia 15 minutes after injection, capable of influencing the overall coagulability in the rabbit. The heparinaemia remained effective until the 8th hour.

(2) Intravenous injection into the rabbit 3 rabbits, after fasting for 24 hours, were intravenously injected (via the maginal ear vein) with 300 IU/kg of sodium-free calcium heparinate, i.e. about a third of the heparin dose subcutaneously administered during the preceding experiment.

A sample from the biological controls was taken 5 minutes, 1 hour, 3 hours, 4 hours and 5 hours after the injection.

It was found that an intravenous dose about 3 times as small as the subcutaneous dose produced a high heparinaemia (above 1.1 IU/ml) which appeared in minutes after the injection and lasted 1 to 2 hours, but which disappeared during the 4th hour.

Sodium-free calcium heparinate is particularly indicated in the treatment of all states of hypercoagulability, inter alia those accompanied by embolisms, arterial and venous thromboses, myocardial infarctions, and more particularly all states requiring anti-coagulant treatment, more particularly states wherein high concentrations of heparin are desirable, without risk of local hemorrhagic accidents.

Heparin salts, inter alia calcium heparinate, are preferably administered in the form of solutions in a sterile injectable liquid suitable for the chosen method of administration (injection or perfusion). Glucose serum, for example, is a suitable carrier for the aforementioned three methods of administration.

Administration can be performed under the following conditions:

(a) subcutaneous:
   preventive treatment: 500 IU, twice a day for 7 to 10 days,
   Curative treatment: 13,500 to 20,000 Iu, depending on the state of the patient, twice a day as long as required by the thrombolytic state of the patient;
(b) intravenous:
   20 to 40,000 IU suitably distributed through the 24 hours, preferably by adjusted perfusion;
(c) Intramuscular:
   5 to 10,000 Iu, three times a week.

Of course, as the preceding clearly shows, the invention is in no way limited to those applications and embodiments which have been described in detail, but includes all variants.

We claim:

1. A method of manufacturing a water-soluble heparin salt, or a water-soluble mixed heparin salt with a reduced content of sodium, said salt having a cation which is a metal other than sodium, which method comprises (1) in a first step, contacting in an aqueous medium, a solution of an initial simple salt of heparin with a salt of the metal to be substituted for the metal of the initial salt of haparin, thereby substituting a portion of the metal of the initial salt of heparin by the metal, (2) separating the liberated metal ions of the initial salt of heparin from said medium, and in a subsequent step, (3) contacting in the solution said resulting heparin salt solution, wherein the salt is partially substituted now with a reduced content of the initial metal and is partially, but with an increased amount substituted with the metal to be substituted, with a solution of the salt of the metal to be substituted and obtaining in the solution a heparin salt enriched in the substituting metal and having a reduced content of sodium.

2. The method of claim 1 which comprises in said second step repeating the contacting with a solution of the substituting salt until there results the heparin salt which substantially contains only the substituting metal and is free from the metal of the initial simple heparin salt.

3. The method of claim 1 for making a mixed heparin salt which comprises contacting in a further step the solution of the simple heparin salt of the substituting metal obtained after the subsequent step with a salt of a different metal, forming a water-soluble mixed heparin salt of the aforementioned substituting metal and the aforementioned different metal, and separating said mixed heparin salt.

4. The method according of claim 2 which comprises separating the metal ions liberated in the solution by dialysis.

5. The method according of claim 4 which comprises starting the dialysis for separating the liberated metal ions when the competition between the metal ions in the initial heparin simple salt and the ions in the salt of the substituting metal has reached such level that it tends to prevent the substitution of the metal from continuing.

6. The method of claim 2 which comprises carrying out the separation by precipitation in a medium in which the salts formed by the liberated metal ions are soluble, redissolving the precipitated heparin salt in an aqueous medium before recontacting during the subsequent step with the salt solution containing the substituting metal.

7. The method of claim 6 wherein the precipitation is performed with alcohol in an aqueous alcoholic medium.

8. The method of claim 4 which comprises, in addition, precipitating the formed heparin salt in solution, and re-dissolving the precipitated heparin salt in an aqueous medium.

9. The method according of claim 2 wherein the initial simple heparin salt is a sodium heparin.

10. The method of claim 9 wherein the salt of the substituting metal is calcium.

11. The method of claim 9 wherein the salt of the substituting metal is magnesium.

12. The method of claim 3 wherein the initial simple heparin salt is a sodium heparin, the salt of the substituting metal used in the first and subsequent step is a calcium or magnesium salt, and the salt of the different metal used in the further step is magnesium, calcium or sodium.

13. The method of claim 4 wherein, in the first step, the initial sodium heparin salt is contacted with an excess of a solution of calcium salt until a mixed heparin salt is obtained in solution containing about 6% by weight of calcium, carrying out the dialysis of the medium against demineralised water until the proportion of calcium fixed to the heparin in solution is of about 7.56%, subjecting the resulting medium to alcoholic precipitation of the heparin salt formed and redissolving same in an aqueous medium and further contacting the dissolved salt until there is obtained a calcium heparin salt containing between 10.3 and 10.6% calcium.

14. A method of producing a simple salt of heparin containing cations of a given metal other than sodium which comprises, in a first step, contacting in an aqueous solution, a solution of an initial simple salt of heparin containing cations of a metal different from said given metal, with a solution of another salt of said given metal and, in a second step, separating the free metal ions from the resulting solution and adding to the latter a predetermined amount of said other salt in solution, thereby continuing the substitution in the heparin salt of said given metal for the metal of the initial heparin salt.

15. A method of producing a solution of heparin containing cations of a given metal which comprises, in a first step, contacting, in an aqueous solution, a solution of an initial simple salt of heparin containing cations of a metal different from said given metal, with a solution of another salt of said given metal and, in order to obtain a salt of heparin containing a determined amount of cations of said given metal higher than is achieved in said first step, separating the free metallic ions from the resulting solution, adding to the latter an amount of said another salt, in solution, dependent upon that said higher determined amount of cations of said given metal and obtaining a solution of heparin, the heparin having an increased amount of the other salt.

16. A method for producing mixed salts of heparin containing cations of at least two given metals starting from an initial salt of heparin containing cations of a metal different from said given metals, which comprises, in a first step, (1) contacting the water-soluble initial simple salt of heparin with another water-soluble salt of one of said given metals in an aqueous solution, and, in a subsequent step, (2) separating the liberated metal ions from the solution, (3) adding to the solution of the salt another water-soluble salt, thereby continuing the substitution in the heparin salt of said one given metal for the metal of the initial heparin solution until the substitution ceases, and in a further step, (4) contacting said last-mentioned water-soluble simple heparin salt with another water-soluble containing cations of the other of said given metals, in an amount dependent upon the desired ratio of said two given metals in the final mixed water-soluble salt of heparin and separating the water-soluble mixed salt from the solution.

17. The method of claim 16 which comprises repeating the subsequent step until the substitution is completed.

18. The method of claim 17 wherein said initial salt of heparin is sodium and said given metals are calcium and magnesium, respectively.

19. The method of claim 4 wherein the dialysis is carried out in part at least concurrently with the first contacting step of the two solutions.

20. The method of claim 2 wherein the separation of the salt of heparin from the liberated ions from the solution is carried out.

21. A method of making a solution of a simple or mixed heparin salt of a reduced, predetermined content of a metal from an initial water-soluble salt of heparin, which comprises contacting, in an aqueous medium, an initial water-soluble salt of heparin with an excess of a water-soluble salt of the metal to be substituted for the metal in the initial water-soluble heparin salt, the improvement which comprises (1) simultaneously subjecting said medium to dialysis, separating the formed water-soluble salt from the liberated metal ions in solution, and obtaining a solution of a water-soluble heparin salt product of reduced content of the metal of the initial heparin salt, whereby a greater substitution of the metal to be substituted for the metal in the initial heparin salt is obtained than when the same contacting operation is carried out under comparable conditions but without dialysis.

22. The method of claim 21 wherein the step of subjecting the medium to dialysis is started not later than at the time when competition between the metal of the starting water-soluble heparin salt and the metal ions of the metal to be substituted prevents the substitution from continuing.

23. The method of claim 21, wherein the initial heparin salt is a solution of sodium heparin and the salt of the metal to be substituted for the metal in the initial heparin salt is calcium.

24. The method of claim 23, wherein the dialysis is started when about 6 percent of the sodium in the initial water-soluble heparin salt has been replaced by calcium from a solution of a calcium salt.

25. The method of claim 24, wherein the initial heparin salt solution is contacted with a quantity of calcium salt which corresponds to an addition of 12 percent calcium.

26. The method of claim 21 wherein the product is a solution of a mixed salt.

27. The method of claim 21 wherein the product is a solution of a simple salt.

28. The method of claim 21 which comprises precipitating the heparin salt product in an aqueous alcoholic medium.

29. A method of making a simple or a mixed heparin salt of a reduced, predetermined content of an initial salt from an initial salt of heparin, which comprises (1) contacting, in an aqueous medium, an initial water-soluble salt of heparin with an excess of a salt of the metal to be substituted for the metal in the initial heparin salt producing a solution of a heparin salt which has a reduced content of the metal of the initial salt and an increased content of the metal of the substituting metal and precipitating with alcohol the heparin salt product in an aqueous alcoholic medium having a strength not exceeding 70° GL, in which the salts formed by the metal ions liberated from the initial salt of heparin are soluble.

30. The method of claim 29 wherein the initial heparin salt solution is sodium heparin salt and the salt of the metal to be substituted for the metal in the initial heparin salt is calcium.

31. The process of claim 1 which comprises contacting further the heparin salt solution, in an aqueous medium, with a solution of a salt of a metal to be substituted for the metal in the heparin salt solution and recovering a heparin salt further enriched the substituting metal.

32. The method of claim 22 wherein the dialysis is started at the time when competition between the metal of the starting heparin salt solution and the metal ions of the metal to be substituted in solution prevents the substitution of one metal for the other from continuing.

33. A multi-step method of producing in an aqueous solution a solution of a heparin metal salt other than a simple sodium salt, which comprises
(1) contacting, in an aqueous solution, a solution of a water-soluble heparin metal salt with a water-soluble metal salt other than sodium, thereby causing partial substitution of said metal of the heparin salt and liberating said metals in the solution to obtain a solution of a water-soluble intermediate mixed heparin metal salt of decrease sodium content,
(2) removing the liberated metal ions from the solution, and
(3) contacting the intermediate heparin salt with a water-soluble metal salt other than sodium, thereby causing further substitution of said metal of the heparin salt, liberating further metals in the solution and
(4) removing same from the solution and
(5) obtaining a solution of heparin metal salt substantially free of the metal initially present.

34. The process of claim 33 which comprises repeating the contacting and removing steps identified under paragraphs (3) and (4).

35. The process of claim 33 which comprises collecting the intermediate water-soluble mixed salt, redissolving it in an aqueous solution prior to the next contacting step.

36. The process of claim 33 wherein the pH is maintained above about 7.0 during the substitution of the metal.

37. The process of claim 36 which comprises precipitating the intermediate water-soluble salt in an acid aqueous solution with alcohol, collecting the resulting intermediate water-soluble salt, redessolving it in an aqueous solution prior to the next contacting step.

38. The process of claim 34 which comprises maintaining the pH above about 7.0 during the further contacting step.

39. The process of claim 36 which comprises collecting the resulting heparin metal salt from the solution, which resulting salt is substantially free of metal initially present.

40. The process of claim 33 wherein the liberated metal ions are removed from the solution of the intermediate mixed heparin salt by dialysis of the solution.

41. The process of claim 33 wherein the liberated metal ions are separated from the solution of the intermediate mixed heparin salt by selective precipitation of the intermediate mixed heparin salt with and in a liquid medium wherein the liberated metal ions remain soluble.

42. The process of claim 40 wherein the starting salt is sodium and the resulting salt is the calcium salt of heparin.

43. The process of claim 33 wherein separating and collecting the water-soluble heparin salt substantially free of the metal initially present from the solution in which it was formed.

44. The process of claim 1 wherein separating and collecting the water-soluble heparin salt substantially free of the metal initially present from the solution in which it was formed.

45. The process of claim 33 wherein the substitution of said metal of the heparin salt does not proceed further when the removal of liberated metal ions from the solution is started.

46. The process of claim 45 wherein the substitution of said metal of the heparin salt does not proceed further when the removal of liberated metal ions from the solution is started.

47. The process of claim 46 wherein the substitution of said metal of the heparin salt does not proceed further when the removal of liberated metal ions from the solution is started by dialysis.

* * * * *